Patented Mar. 27, 1951

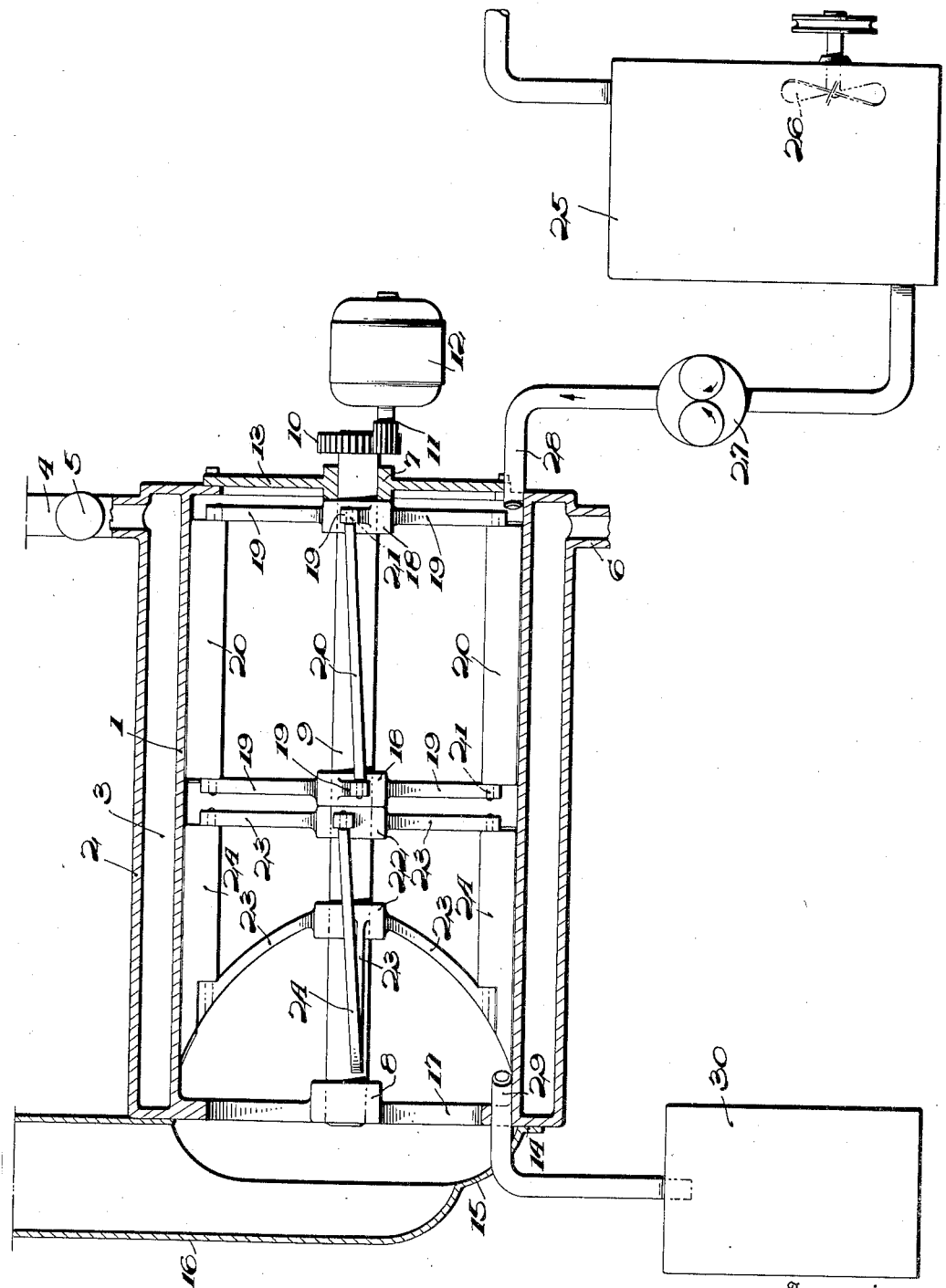

2,546,250

UNITED STATES PATENT OFFICE 2,546,250

PROCESS OF CONCENTRATING YEAST SLURRIES

Stanley L. Baker, Loveland, Ohio, assignor to Institutum Divi Thomae Foundation, Cincinnati, Ohio, a corporation of Ohio Application January 20, 1947, Serial No. 723,122

5 Claims. (Cl. 195—98)

This invention relates to the concentration of dilute suspensions or slurries of yeast and especially of brewers' yeast slurry which will be referred to hereinafter as an example although it will be understood that the invention is not restricted thereto. This application is a continuation in part of my prior application Serial No. 521,246, filed February 5, 1944, abandoned July 28, 1947.

The yeast solids remaining after the manufacture of beer are very desirable as constituents of both animal and human diets, being rich in vitamins and highly nutritious, but nevertheless large quantities of these materials have heretofore been sent to waste for lack of a practical method of handling them. The slurry remaining in the brewers' vats contains more than one-half of 1% alcohol and can not be shipped from the brewery in this condition because of Federal regulations with respect to alcoholic beverages. By removing most of the free liquid, cake yeast is produced containing around 25% solids, but the market for this product is limited and further it must be kept constantly under refrigeration since otherwise autolysis and bacterial and mold growth set in and the product soon becomes unfit for consumption. For general use in feed mixtures, on the other hand, the yeast must be dried say to 7–8% moisture which is a very difficult operation because of the remarkably high foaming qualities of the yeast slurry. A limited amount of such dried yeast has been produced heretofore by drying plants operated as an adjunct to and either in or closely adjacent to large breweries, but this drying operation can not be justified economically in many breweries of moderate or relatively small size.

Hence very large quantities of yeast slurry have been flushed down the sewer or otherwise discarded in spite of the fact that disposal of the slurry is in itself a troublesome and annoying problem and further in spite of the economic waste involved. The slurry is a dilute beery liquid ranging from 4 or 5% to 18% but usually about 12% solids and saturated with carbon dioxide at a temperature of about 34° F. A slight rise in temperature of only a few degrees, coupled with movement or agitation of the liquid, is sufficient to initiate the formation of foam which is very strong and persistent since the bubbles do not break and subside readily but instead maintain their identity even after substantial drying has taken place. In fact the thick heavy foam may actually choke sewer lines from which it can be washed out only with difficulty.

As far as I am aware, no practical method has been devised heretofore for handling such brewers' slurry, so as to eliminate disposal problems and waste and to enable shipment of the slurry for processing into feed mixtures. Before it can leave the brewery, the slurry must first be treated to reduce its alcohol content within the prescribed limit mentioned above. The characteristic foaming action of the dilute slurry renders this operation difficult to perform and further presents practically insuperable difficulties as far as transporting the slurry to central drying plants is concerned. In open containers the slurry foams and overflows the container very quickly under the combined effects of gradually increasing temperature and agitation. In sealed containers pressure develops under these effects to such an extent that the slurry can not be handled when the container is opened. Moreover at 40–45° F. the yeast cells begin to autolyze and distintegrate with accompanying objectionable changes in the material which may render it toxic when used in poultry and animal feeds. Hence even with heat insulated tank trucks moving directly from the brewery to the drying plant, the hauling time must be limited to 2–3 hours and the effective radius from the drying plant within which yeast slurry can be collected is thus restricted to say 25 miles.

The present invention provides a simple, continuous and automatic process which can be carried out with relatively simple and inexpensive equipment whereby such yeast slurries can be partially concentrated by evaporation to a solids content of 25–45%. Slurries containing live yeast become viscous and pasty at low solids contents and can not be handled as a slurry above about 18% solids, as in the case of cake yeast. However, the heat of evaporation kills the yeast cells and changes the characteristics of the slurry so that it remains flowable at much higher solids contents. Thus when the solids amount to about 25% or more, the slurry is readily flowable. On the other hand, the viscosity and surface tension of the slurry are increased to the point where foaming no longer interferes with its handling and transportation. Above 45% solids the slurry becomes so thick that it is no longer readily flowable even while hot. Between these limits, the slurry may simply be pumped or otherwise caused to flow directly from the vat, through the concentration zone and thence into drums or other suitable containers. On cooling, the partially concentrated slurry becomes a thick, viscous liquid and may set up in the container to a more or less salvy consistency. However, it is no longer subject to foaming and is sufficiently stabilized against autolysis and bacterial and mold invasion that the containers can be held until they can be picked up and transported by truck or shipped by rail to central drying plants without refrigeration.

Hence the invention is particularly adapted for use in breweries located at relatively remote points with respect to central drying plants. From the standpoint of the brewery, the use of the process eliminates the vexatious problem of disposing of the dilute slurry and converts a waste material into a valuable by-product. On the other hand, large supplies of heretofore waste yeast are thereby made economically available for use in poultry and animal feed mixtures, etc. It is to be understood, however, that the invention is not restricted to this particular application. For example, the invention can be employed advantageously with drum drying to produce dry yeast solids, as disclosed in my copending application Serial No. 726,061, filed February 3, 1947.

In order to effect the partial concentration of the yeast slurry by a continuous, automatic and economical process suitable for the above purposes, it is desirable to flow the slurry in a thin film over the heated surface of a film evaporator. However, the conditions existing in such a case ordinarily cause aggravated and excessive foaming which renders the operation impracticable. The evaporating surface is quite hot compared to the entering slurry and bubbles form immediately next to this surface and push up through the film to its upper surface but do not break. Foaming is thus started, and as more and more bubbles form the film is converted rapidly into a mass of bubbles instead of a flowable slurry. Indeed, in the case of externally heated evaporators such as jacketed cylinders, foaming may easily become so excessive that the foam rises up and out the exhaust vapor stack, causing a loss of slurry and also hindering the escape of moisture. At best, the foam on the evaporating surface no longer acts as a flowing liquid film and does not dry effectively and much of the material adheres to the surface and becomes scorched or charred.

I have found that the evils of foaming and scorching can be avoided and the desired partial concentration effected as a continuous practical operation by maintaining a certain maximum thickness of film correlated with a rapid rate of evaporation of moisture from the film as set forth hereinafter. It is also advantageous to agitate the material in the film more or less continuously and simultaneously with the spreading and feeding of the material in order to minimize the danger that some of it will adhere to the evaporating surface and scorch or burn, as well as to assist in breaking up large bubbles that may be formed. When these conditions are maintained, the yeast slurry flows through the evaporator as a film without foaming and the desired partial concentration is obtained without charring or like deleterious effect.

More particularly, the depth or thickness of the film of dilute slurry at the inlet end of the evaporator where the water content is greatest, and the viscosity and surface tension are least, should not be permitted to exceed 0.3". It will be understood that as the material moves on through the evaporator, the initial film thickness may decrease due to reduction of volume accompanying the loss of water and also to the hydrostatic head of the film at the inlet end as compared with the outlet end. The rate of heat input to the film and the corresponding rate of evaporation of moisture from the film should be rapid enough to produce the desired degree of concentration within a few minutes, in order to avoid overcooking the yeast and to maintain a continuous flow of material through the evaporator at a practicable rate. Hence the rate of evaporation of moisture from the film should not be less than about 35 lbs. of water per square foot of film per hour. Under these conditions the slurry can be concentrated to a solids content of 25–45% within a time period in the approximate range of 1–2 minutes without either foaming or scorching while maintaining its flowable state throughout the operation.

It is difficult to explain exactly what takes place in the film under the above conditions to prevent foaming. However, an important factor is the size of the bubbles which form at the bottom of the film adjacent the hot evaporating surface. If the film is so thick that the majority of these bubbles form completely within the film without breaking at its surface, then the continual formation of bubbles at the bottom of the film causes the foam to build up rapidly with the undesirable results described above. Moreover, the layer of material actually in contact with the hot surface becomes very thin at many places and there is danger of spotty uneven drying and sticking followed by scorching of the solids. However, satisfactory operation in these respects is secured at film thicknesses such as specified above. On the other hand, the prescribed rate of evaporation requires a correspondingly high rate of heat input to the film which in turn tends to form larger bubbles and produce a rather violent boiling action, thus cooperating with the thin film so that most of the bubbles break at the surface of the film and release the heated vapors without causing foaming. Due to these effects the rate of evaporation from the film may be greatly increased above the minimum specified above, say to 70–90 lbs. per square foot of film per hour or even higher.

The specified film thickness is independent of variations in temperature and pressure within the evaporator since the average size of the bubbles remains constant for practical purposes. For example, if the pressure above the film is atmospheric, the temperature of the film will be approximately 212° F. and for a given viscosity and surface tension these conditions will govern the size of a bubble containing a given quantity of heated vapors. If the pressure above the film is increased to greater than atmospheric, as in a closed pressure type apparatus, the temperature of the film increases correspondingly and the size of the bubble remains substantially unchanged since it is a function of both pressure and temperature. Generally such increased temperature and pressure is undesirable because of the increased danger of scorching or charring, as well as the fact that the characteristics of the protein may begin to change and vitamins and other heat-labile factors may be destroyed if the temperature is much above 212° F. for any length of time. Similarly vacuum evaporating equipment may be used in which event the pressure and temperature in the film are decreased, but there is no significant change in the average bubble size. In some cases vacuum evaporation may be preferred because there is less damage to the yeast cells at lower temperatures.

The degree of concentration within the above limits of 25–45% solids can be varied as may be desired under differing conditions. If the concentrated slurry is to be packed in sealed containers, it will keep indefinitely at any concentration within these limits. In open drums or the like, the concentration of the slurry to 25–30% solids provide satisfactory keeping qualities for periods of one or two days, but a higher degree of concentration is preferable to prevent bacterial action and autolysis taking place in the concentrated slurry over longer periods. Concentration to a solids content in the range of 35–45% affords good protection against these undesirable effects for periods of thirty days or more in open containers.

It has been noted that concentration of the slurry by the process set forth above does not appear to damage the membranes or sacs of the yeast cells, apart from some mechanical damage incident to handling the material. The cells are killed but most of the cell walls appear to remain intact without bursting or rupturing. Thus on standing, some liquid may pass through the cell walls and form a supernatant layer of clear liquid, but there is no general release of the cell contents.

Various types of film evaporators are known in the art and generally speaking any such evaporator can be used in practicing the process of the present invention, provided only that it is capable of establishing and maintaining the film conditions and rate of evaporation described above. In most cases, however, it is preferable to employ a closed externally heated cylindrical evaporator operating at atmospheric pressure with the slurry film on its inner surface. By way of example, the accompanying drawing illustrates the practice of the process with a film evaporator of this preferred type.

The evaporator, as shown diagrammatically in the drawing, may suitably comprise a double walled cylindrical vessel the inner wall 1 of which forms the evaporating surface and the outer wall 2 of which cooperates with the inner wall to form a jacket 3 to which steam or the like is admitted through a pipe 4 and valve 5 and from which the steam is exhausted through a pipe 6. Bearings 7 and 8 at the opposite ends of the cylinder carry an axial shaft 9 which is driven in any suitable manner as by means of gears 10, 11 and an electric motor 12. The ends of the cylinder are closed in any suitable manner, as by means of a plate 13 at one end and a plate 14 at the other end which is flared at 15 to connect with a vapor stack 16 through which the evaporated moisture escapes. Bearing 7 may be carried by the end plate 13, while bearing 8 is carried by supports 17 forming part of the drum at its other end.

The shaft 9 carries one or more blades or paddles which serve to distribute the slurry in a film on the inner surface of the drum and to agitate the material in the film while at the same time feeding the material both circumferentially and axially through the drum. These blades or paddles may have any one of various forms known to the art. As shown for purposes of illustration, the shaft 9 carries two blade units. The right-hand unit comprises spaced hubs 18 secured to the shaft 9 and having radially extending spokes 19, blades 20 being pivotally mounted at 21 between the ends of each pair of spokes. The spokes of each pair are off-set angularly relative to each other so that each blade 20 is inclined to the axis of the drum. The left-hand unit comprises a similar pair of hubs 22 secured at longitudinally spaced points on the shaft 9 and having radially extending spokes 23 carrying pivoted blades 24 similar to the blades 20 of the right-hand unit. Preferably the left-hand hub 22 nearest the vapor stack is set inwardly on the shaft from the end of the drum and its spokes 23 are arranged to extend both radially and also longitudinally away from the hub toward the end of the drum so as to minimize fan action at this end.

The dilute slurry to be concentrated is stored in a suitable supply tank 25 having agitating means 26 to prevent settling of solids in the tank. The slurry is pumped from the tank by suitable means such as a gear pump 27 and passes through an inlet pipe 28 into the right-hand end of the drum. The concentrated slurry leaves the drum at its other end through an outlet 29 and is discharged into a suitable container 30 which may be either a storage tank or a drum or the like in which the concentrated slurry is to be shipped.

It will be seen that the thickness of the film on the inner surface of the evaporator is a function of the quantity of slurry in the evaporator at any instant. For example, assume that the evaporator shown in the drawings is three feet in diameter and three feet in length. Then if the evaporator contains two gallons of slurry, the average film thickness will be between 0.11 and 0.12 inch. Allowing for decreasing depth of the film from the inlet to the outlet end of the evaporator for reasons set forth above, the depth of the film at the inlet end will approach 0.2 inch and its depth at the outlet end may be as low as 0.05 or 0.06 inch. With steam pressure in the jacket 3 sufficient to evaporate moisture from the film at the rate of 70 lbs. per square foot of film per hour, the total amount of water evaporated will be approximately 2,000 lbs. per hour and the output of the evaporator in terms of slurry concentrated to 25% solids will be about 200 gallons per hour.

The rate of feed of the slurry through the evaporator can be suitably controlled as by varying the speed of rotation of the shaft 11 and the angle of the blades. About 35 seconds is required in the above example. If a higher degree of concentration is desired, the feed of the material can be adjusted or the length of the evaporator can be increased to provide a longer time of exposure of the slurry to the hot evaporating surface. Thus in the case of the above example, the maximum of 45% solids is reached by increasing the length of the cylinder from three feet to about four and one-half feet. The time of exposure of the slurry to the evaporating surface is thus increased from about 35 seconds to 50–55 seconds.

It will be understood that the invention is not limited to the use of the particular equipment described above for purposes of example, and also that various changes may be made in the details of the process without departing from the spirit of the invention. Reference should therefore be had to the appended claims for a definition of the limits of the invention.

What is claimed is:

1. The process of partial concentration of a dilute yeast slurry containing not more than about 18% yeast solids to a solids content of about 25–45% which comprises spreading the slurry in a film on a heated evaporating surface with a maximum film depth of 0.3 inch, moving the film over said surface with agitation while maintaining a rate of heat input to said film sufficient to evaporate at least 35 lbs. of water per hour per square foot of film, and removing the slurry from said surface when the solids content thereof reaches the desired value in the range of 25-45%.

2. The process of continuous partial concentration of a dilute yeast slurry containing not more than about 18% yeast solids to a solids content of about 25-45% which comprises continuously flowing a film of the slurry with agitation over a heated evaporating surface, the maximum film depth being 0.3 inch, maintaining a rate of heat input from said surface to the film sufficient to evaporate at least 35 lbs. of water per hour per square foot of film, and discharging the flowing material from said surface when the solids content thereof reaches the desired value in the range of 25-45%.

3. The process of continuous partial concentration of a dilute yeast slurry containing not more than about 12% yeast solids which comprises continuously delivering the dilute slurry to a film evaporator, spreading the slurry in a film on the evaporating surface with a maximum film depth of 0.3 inch, moving the film over said surface with agitation while maintaining a rate of heat input from said surface to said film sufficient to evaporate at least 35 lbs. of water per hour per square foot of film, and continuously discharging the flowing material from said surface after a maximum time of exposure thereto of approximately two minutes whereby the slurry is partially concentrated to a solids content in the approximate range of 25-45%.

4. The process of continuous partial concentration of a dilute yeast slurry containing about 12% yeast solids to a solids content of 25-45% which comprises continuously delivering the slurry to, spreading it in a film and moving the film with agitation over, and discharging the partially concentrated and still flowable slurry from a heated evaporating surface, the time of contact of the film with said surface being in the approximate range of 30-60 seconds, the maximum depth of film on said surface being 0.3 inch and the rate of heat input from said surface to said film being sufficient to evaporate about 70 lbs. of water per hour per square foot of film surface.

5. The process of continuous partial concentration of a dilute yeast slurry containing about 12% solids to a solids content of 25-45% which comprises continuously delivering the dilute slurry to and spreading it in a film and moving the film with agitation over a heated evaporating surface, the maximum depth of film on said surface being 0.3 inch and the rate of heat input from said surface to said film being sufficient to evaporate about 70 lbs. of water per hour per square foot of film, and discharging the partially concentrated and still flowable slurry from said surface when the solids content thereof reaches the desired value in the range of 25-45%.

STANLEY L. BAKER.

REFERENCES CITED

The following references are of record in the file of this patent:

UNITED STATES PATENTS

| Number | Name | Date |
|---|---|---|
| 1,225,348 | Merrell | May 8, 1917 |
| 1,420,641 | Mabee | June 27, 1922 |
| 1,440,548 | Mellott | Jan. 2, 1923 |
| 1,690,753 | Renneburg | Nov. 6, 1928 |
| 2,235,614 | Grelck | Mar. 18, 1941 |
| 2,391,918 | Pattee | Jan. 1, 1946 |

FOREIGN PATENTS

| Number | Country | Date |
|---|---|---|
| 23,055 | Great Britain | of 1906 |